No. 635,458. Patented Oct. 24, 1899.
J. W. ALBERT.
DRILL CHUCK.
(Application filed June 14, 1899.)
(No Model.)
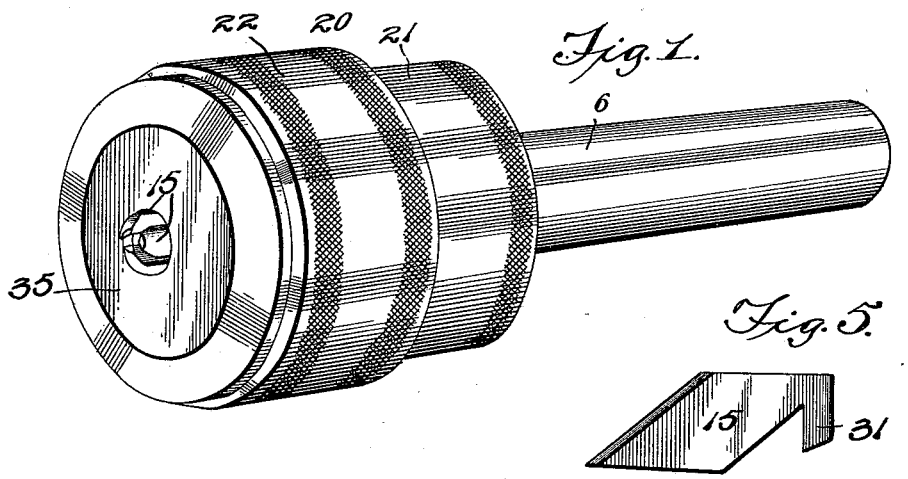
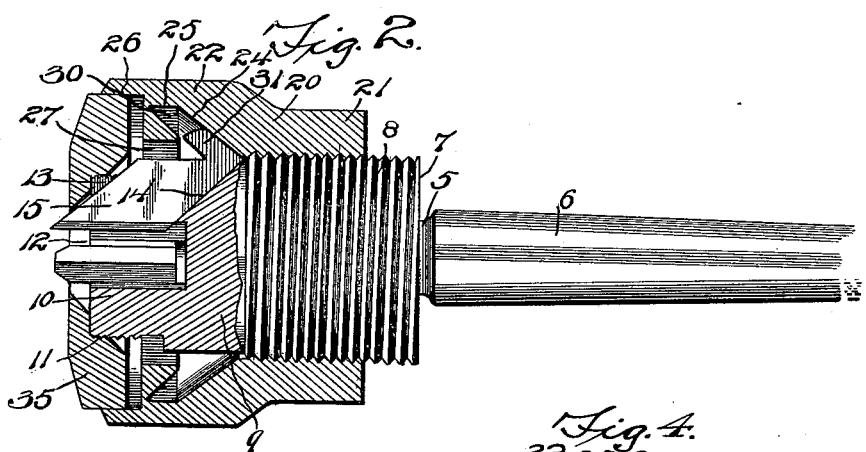
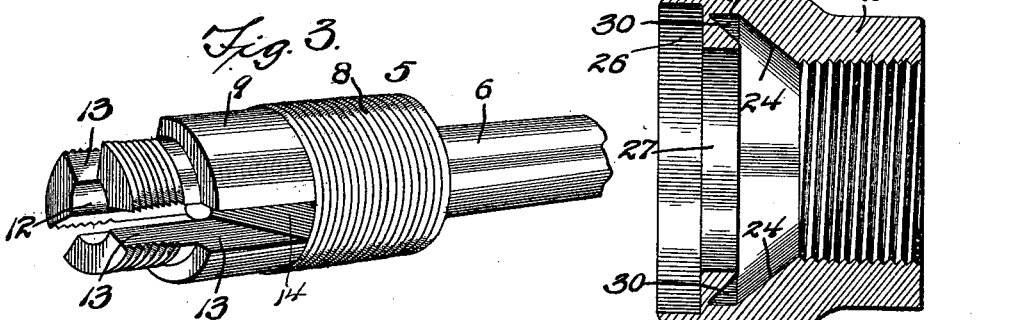
Witnesses
Ralph A. Shepard
Geo. H. Chandler
James W. Albert, Inventor
By his Attorneys,
C. A. Snow & Co.

UNITED STATES PATENT OFFICE.

JAMES W. ALBERT, OF AUBURN, NEW YORK.

DRILL-CHUCK.

SPECIFICATION forming part of Letters Patent No. 635,458, dated October 24, 1899.

Application filed June 14, 1899. Serial No. 720,558. (No model.)

*To all whom it may concern:*

Be it known that I, JAMES W. ALBERT, a citizen of the United States, residing at Auburn, in the county of Cayuga and State of New York, have invented a new and useful Drill-Chuck, of which the following is a specification.

This invention relates to chucks in general, and more particularly to that class known as "drill-chucks" and which are adapted to be employed in connection with the head-stock of a lathe, the object of the invention being to form a chuck of such a construction that there will be a minimum of parts and in which the jaws will be loosely held without any thread connections whatever, thus overcoming a popular source of annoyance and eliminating the weak point in the usual construction of a device of this character.

In the drawings forming a part of this specification, and in which like numerals of reference indicate similar parts throughout the several views, Figure 1 is a perspective view of a chuck with the jaws slightly opened. Fig. 2 is a longitudinal section of Fig. 1 with the threads and rear portion of the spindle shown in elevation. Fig. 3 is a detail perspective view of the spindle. Fig. 4 is a longitudinal section of the carrier or sleeve of the chuck. Fig. 5 is a detail view of a jaw.

Referring to the drawings, in constructing a chuck in accordance with this invention I form a spindle 5, the rear portion of which is reduced and tapered, as shown at 6, and is adapted to take the place of the live center in the hollow spindle of the head-stock of a lathe. The outer end 7 of the spindle is enlarged, is cylindrical in form, and is threaded from the rear end forwardly for a suitable distance, as shown at 8, for a purpose which will be presently explained.

That portion of the spindle lying in front of the threads 8 is slightly reduced in diameter, as shown at 9, the forward end of the spindle being further reduced, as shown at 10, and provided with screw-threads 11. A cylindrical perforation 12 is formed concentric with the spindle and extends from the forward end thereof into the portion 9. Radially of the portion 10 of the spindle are formed three slots 13 equidistant mutually, the bottom walls 14 of said slots extending outwardly and downwardly at an angle of substantially forty-five degrees to the axis of the spindle, said walls beginning on the line of the inner end of the portion 10 and extending into the portion 9 and terminating at the threads 8. In each of the slots 13 is slidably mounted a jaw 15 in the shape of a rhombus, the obtuse angle of two of its sides being equal to the major angle between the base 14 of a slot 13 and the axis of the spindle. Thus when a jaw is seated in its slot it may be disposed in such a manner that one of its sides will lie upon the base of the slot and an adjacent side lying at an obtuse angle thereto will lie parallel with the axis of the spindle, and thus by moving the jaws over the bases of their respective slots the mutually adjacent sides of the edges will approach or recede with respect to each other. These immediately adjacent edges of the several jaws are beveled at angles of one hundred and twenty degrees, so that they may fit closely together.

In order to move the jaws along the bases 14 to cause this approaching and receding movement, I provide a carrier comprising a sleeve 20, the rear portion 21 of which is contracted and interiorly threaded to engage the threads 8 upon the spindle, so that when said carrier is rotated with respect to the spindle it will at the same time have a longitudinal movement. The forward end of the carrier is enlarged, as shown at 22, as is also the bore thereof, the inner end of said bore being tapered at an angle of substantially forty-five degrees to the axis thereof, the inner end of said taper terminating at the forward end of the threaded bore of the minor portion 21 of the carrier. From the taper 24 outwardly the bore of the portion 22 is cylindrical for a short distance, as shown at 25, and is then increased in diameter and is cylindrical throughout the remaining length of the carrier, as shown at 26. Intermediate the portions 25 and 26 is formed an inwardly-directed annular flange 27, the outer face of which lies at right angles to the axis of the carrier and the inner face of which lies parallel with the wall of the taper 24. The inner periphery of the flange is concentric with the axis of the carrier. The result is the formation of an outwardly and forwardly directed recess 30, the upper and lower walls of which are parallel. This recess is adapted to receive an upwardly and forwardly directed lug 31 upon each of the jaws 15 and extending from the lower end thereof, the lower face of said lug lying upon the face of the taper 24 and the opposite face of the lug lying upon the opposite face of the recess. Thus if the carrier be moved forwardly of the spindle the engagement of the taper with the lug 31 will act to move the jaws 15 forwardly and inwardly through the slots 13 and along the bases 14 of the latter, the direct outward movement of the jaws being prevented by a circular plate 35, having a tapered opening centrally thereof, through which the outer ends of the jaws are adapted to protrude and with the tapered walls of which the outer ends of the jaws are adapted to engage. The bases 14 lie parallel with the corresponding lines in the wall of the tapered opening. The plate 35 has a thickness at its edges sufficient to allow it to lie in the bore 26 of the carrier at all times during the reciprocation of the carrier in the operation of clamping and holding a drill or other body, thus preventing the falling of chips or other foreign matter into the inclosure of the carrier and the consequent interruption of the operation of the latter. This plate 35 is held in place through the medium of threads upon a peripheral recess in the face of the tapered opening of the plate, which threads engage the threads 11 upon the portion 10 of the spindle.

When the carrier 20 is moved rearwardly of the spindle, the upper wall of the recess 30 will engage the upper face of the lug 31 of each jaw and will draw the jaws rearwardly and downwardly, the bases 14 causing said jaws to move at the same time radially of the spindle, the lugs 31 moving upwardly and into the recess 30. Thus it will be seen that by manipulation of the carrier the jaws may be caused to mutually approach or recede to grip or release the drill or other body, the only threaded engagement being between the spindle and carrier in the operation of the mechanism, and thus will there be a minimum of wear and a corresponding long life of the chuck.

It will be readily understood that I may alter the arrangement herein shown and described and that in practice I may form the parts of whatever material I may desire without departing in any manner from the spirit of my invention.

Having thus described my invention, what I claim is—

1. A chuck comprising a threaded spindle having radial slots with converging bases, a plate carried by the spindle and having an opening therethrough, the wall of which converges outwardly, jaws mounted in said slots and having parallel edges adapted to engage the wall of the opening of said plate and the bases of their respective slots, outwardly and upwardly extending projections upon the jaws, and a carrier in threaded engagement with the spindle and rotatable thereon and having an annular upwardly and outwardly extending groove in its inner face in which the projections of the jaws are adapted for outward and lateral movement and through the medium of which motion is communicated from the carrier to the jaws to move them in their slots.

2. A chuck comprising a threaded spindle having radial slots with converging bases, a plate adjustably mounted upon the spindle and having an opening therethrough, the walls of which converge outwardly and lie parallel with the bases of the slots in the spindle, jaws mounted in said slots and having parallel edges adapted to engage the wall of the opening of said plate and the bases of their respective slots, outwardly and forwardly directed projections upon the jaws, and a carrier in threaded engagement with the spindle and rotatable thereon, said carrier having an annular groove in its inner face extending outwardly and forwardly to snugly receive the projections upon the jaws, whereby when the carrier is rotated in one direction, the projections may be forced from the groove and the jaws moved toward each other, and when the carrier is rotated in the opposite direction, the projections will be drawn into the groove and the jaws moved outwardly and rearwardly along the bases of their respective slots to separate the jaws.

In testimony that I claim the foregoing as my own I have hereto affixed my signature in the presence of two witnesses.

JAMES W. ALBERT.

Witnesses:
F. VAN. PATTEN,
GEORGE M. SISSON.